US009485641B2

(12) United States Patent
 Choi

(10) Patent No.: US 9,485,641 B2
(45) Date of Patent: Nov. 1, 2016

(54) METHOD FOR BRIEFING A SCHEDULE IN A MOBILE COMMUNICATION TERMINAL

(71) Applicant: LG ELECTRONICS INC., Seoul (KR)

(72) Inventor: Yun-Shil Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/313,899

(22) Filed: Jun. 24, 2014

(65) Prior Publication Data

US 2014/0308938 A1 Oct. 16, 2014

Related U.S. Application Data

(63) Continuation of application No. 10/898,073, filed on Jul. 22, 2004, now Pat. No. 8,805,331.

(30) Foreign Application Priority Data

Jul. 25, 2003 (KR) ........................ 10-2003-0051524

(51) Int. Cl.
 *H04M 1/663* (2006.01)
 *H04M 1/725* (2006.01)
 (Continued)

(52) U.S. Cl.
 CPC ........... *H04W 4/18* (2013.01); *H04M 1/72566* (2013.01); *G06Q 10/06311* (2013.01); *G06Q 10/109* (2013.01); *G06Q 10/1095* (2013.01)

(58) Field of Classification Search
 CPC ... H04L 29/06; H04L 65/607; H04L 67/306; H04L 67/325; G06Q 10/109; G06Q 10/1093; G06Q 30/0252; G06Q 10/06314; G06Q 10/06311; G06Q 10/1095; H04W 4/02; H04W 4/021; H04W 68/00; H04W 4/025; H04W 4/00; H04W 4/12; H04W 4/16; H04W 8/18; H04M 1/72569; H04M 1/72566; H04M 1/72572; H04M 1/72522; H04M 1/72577; H04M 1/72547; H04M 1/72597; H04M 2203/2072
 USPC ............ 455/412.1, 412.2, 414.1, 418, 556.2, 455/563, 566, 567
 See application file for complete search history.

(56) References Cited

U.S. PATENT DOCUMENTS 4,769,796 A * 9/1988 Levine ........................... 368/29
5,767,778 A 6/1998 Stone et al.
(Continued)

FOREIGN PATENT DOCUMENTS

GB 2308938 7/1997
JP 2003-030113 1/2003

OTHER PUBLICATIONS

The State Intellectual Property Office of the People's Republic of China Application Serial No. 200410054575.8, Office Action dated Nov. 21, 2008, 11 pages.
(Continued)

*Primary Examiner* — Olumide T Ajibade Akonai
(74) *Attorney, Agent, or Firm* — Lee, Hong, Degerman, Kang & Waimey

(57) ABSTRACT

There is provided a schedule briefing method of a mobile communication terminal having a user schedule management function. The steps of this method include a step for initiating a schedule briefing, a step for determining whether a schedule exists for a predetermined period of time, a step for audibly outputting content of the schedule, and a step for terminating the briefing. The schedule is outputted in a vocal format to allow a hands-free review of a user's schedule.

27 Claims, 3 Drawing Sheets

(51) Int. Cl.
*H04W 4/18* (2009.01)
*G06Q 10/06* (2012.01)
*G06Q 10/10* (2012.01)

(56) References Cited

U.S. PATENT DOCUMENTS

| | | | |
|---|---|---|---|
| 6,208,996 B1 | 3/2001 | Ben-Shachar et al. | |
| 6,484,033 B2 | 11/2002 | Murray | |
| 6,760,412 B1 * | 7/2004 | Loucks | 379/88.13 |
| 6,925,603 B1 | 8/2005 | Naito et al. | |
| 6,928,300 B1 | 8/2005 | Skinner et al. | |
| 6,957,397 B1 | 10/2005 | Hawkins et al. | |
| 6,993,497 B2 | 1/2006 | Yeh et al. | |
| 7,043,278 B2 | 5/2006 | Valade et al. | |
| 7,047,038 B1 | 5/2006 | Macor | |
| 7,242,925 B2 | 7/2007 | O'Neil et al. | |
| 7,421,390 B2 | 9/2008 | Simpson | |
| 7,468,934 B1 * | 12/2008 | Janik | 368/13 |
| 2002/0034969 A1 | 3/2002 | Sundstrom | |
| 2002/0058520 A1 * | 5/2002 | Nakagawa | 455/456 |
| 2002/0131564 A1 | 9/2002 | Wu | |
| 2002/0132645 A1 * | 9/2002 | Sprigg | H04M 1/72566 455/566 |
| 2002/0137552 A1 | 9/2002 | Cannon et al. | |
| 2002/0160745 A1 * | 10/2002 | Wang | 455/404 |
| 2003/0114189 A1 | 6/2003 | Moon | |
| 2003/0206199 A1 | 11/2003 | Pusa et al. | |
| 2003/0212559 A1 * | 11/2003 | Xie | 704/260 |
| 2004/0034709 A1 | 2/2004 | Lee | |
| 2004/0064567 A1 | 4/2004 | Doss et al. | |
| 2004/0230685 A1 * | 11/2004 | Seligmann | 709/228 |

OTHER PUBLICATIONS

European Patent Office Application Serial No. 04014578.1, Search Report dated Feb. 18, 2010, 9 pages.

* cited by examiner

METHOD FOR BRIEFING A SCHEDULE IN A MOBILE COMMUNICATION TERMINAL

CROSS REFERENCE TO RELATED APPLICATIONS

This application is a continuation of U.S. patent application Ser. No. 10/898,073, filed on Jul. 22, 2004, now U.S. Pat. No. 8,805,331, which claims the benefit of earlier filing date and right of priority to Korean Patent Application No. 10-2003-0051524, filed on Jul. 25, 2003, the contents of which are all hereby incorporated by reference herein in their entirety.

BACKGROUND OF THE INVENTION

1. Field of the Invention

The present invention relates to a mobile communication terminal and, more particularly, to a schedule management function of a mobile communication terminal.

2. Description of the Background Art

In general, mobile communication terminals, such as cellular telephones, personal data assistants (PDA's) and the like, include a supplementary function, among others, of managing a user's schedule. Through a schedule management function, important schedules or events, such as anniversaries, appointments, and agendas, can be stored in the mobile communication terminal. Additionally, the function also may serve to inform the user of a scheduled event at a predetermined time or on demand. Often, such schedule management functions are carried out by an "organizer" or "scheduler" installed in the mobile communication terminal.

With reference to FIG. 1, a method for managing a schedule in a mobile communication terminal, in accordance with the related art, will be described as follows.

When a new schedule is added or a content of a previously stored schedule is intended to be changed, the user switches a screen of the mobile terminal to a menu mode by manipulating the mobile communication terminal, such as by pressing a menu function key. Thereafter, the user accesses an organizer menu item by further manipulation of the terminal, such as by pressing a cursor shift button (▲, ▼) or a menu select button, which in turn initiates and drives the scheduler.

For example, as the scheduler is driven, a calendar as shown in FIG. 1 appears. The user may add a new schedule, or correct or delete a previous schedule by moving a date select cursor to a desired date on the calendar. In adding the new schedule (e.g., an appointment), the user can select an "addition" item of the menu and input an appointment time and correspondingly detailed content. After the content of the schedule is completely inputted, the user can press, for example, an "end" button to stop the operation of the scheduler and revert the screen and mode of the mobile communication terminal to a basic set mode.

Thereafter, when the appointment date and time arrive, the organizer or scheduler alerts the user via initiating an alarm (e.g., sound an alarm, creating a vibration, or blinking a light) and outputs the content of the appointment on the screen. When the user checks the schedule, the user may then optionally remove the content of the schedule from the screen.

The above-described schedule managing function is disadvantageous in that since the schedule content is outputted as a text, the only mode of receiving or confirming a schedule is visual. Additionally, if the user's hands are occupied, such as when driving a car or eating, use of the schedule management function of his mobile communication terminal to retrieve a schedule is not very convenient or practical.

SUMMARY OF THE INVENTION

Therefore, an object of the present invention is to provide a schedule briefing method of a mobile communication terminal capable of audibly outputting a schedule.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve at least the above objects in whole or in parts, there is provided a schedule briefing method of a mobile communication terminal having a user schedule management function, the method comprising the steps of: initiating a schedule briefing; determining whether a schedule exists for a predetermined period of time; audibly outputting content of the schedule; and terminating the briefing.

According to one aspect of the present invention, the schedule briefing is initiated via manipulation of a smart key disposed on the terminal. Furthermore, the content of the schedule is vocally outputted by a text to speech (TTS) function, wherein the content of the schedule may be vocally outputted in the form of a voice selected from a group consisting of a male, a female, mechanical, and one or more celebrities. Also, the user may select a tone of the voice.

According to another aspect of the present invention, the briefing may be terminated if no schedule exists for the predetermined period of time and the step of terminating the briefing is audibly announced. Also, the method may further comprise the step of audibly announcing a number of events scheduled for the predetermined period of time.

According to another aspect of the present invention, the method may further comprise the step of audibly outputting supplementary information selected by the user. The supplementary information may be provided by a communication service provider. Finally, the supplementary information may be audibly outputted in a mechanical voice.

It is to be understood that both the foregoing general description and the following detailed description are exemplary and explanatory and are intended to further describe the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

A schedule briefing method of a mobile communication terminal, in accordance to an embodiment of the present invention, refers to a method for audibly outputting a user's schedule, preferably in voice. Furthermore, the method is preferably initiated by the user manipulating the terminal in a single action, such as depressing one key or engaging one device on the terminal. For example, a "smart key," which may be one of plurality of terminal manipulation devices disposed on the mobile communication terminal, may be specially programmed for initiating and operating the schedule briefing method.

When the user's manipulation of a programmed smart key is sensed, a scheduler, which may comprise a plurality of functions including a schedule management function, installed in the mobile communication terminal outputs a user's schedule for a predetermined period. For example, the user may desire to be informed of all events schedule for an entire day or for two hours.

The mobile communication terminal of the present invention also comprises a TTS (Text to Speech) function, which converts text data to audible speech data.

Figure 1:
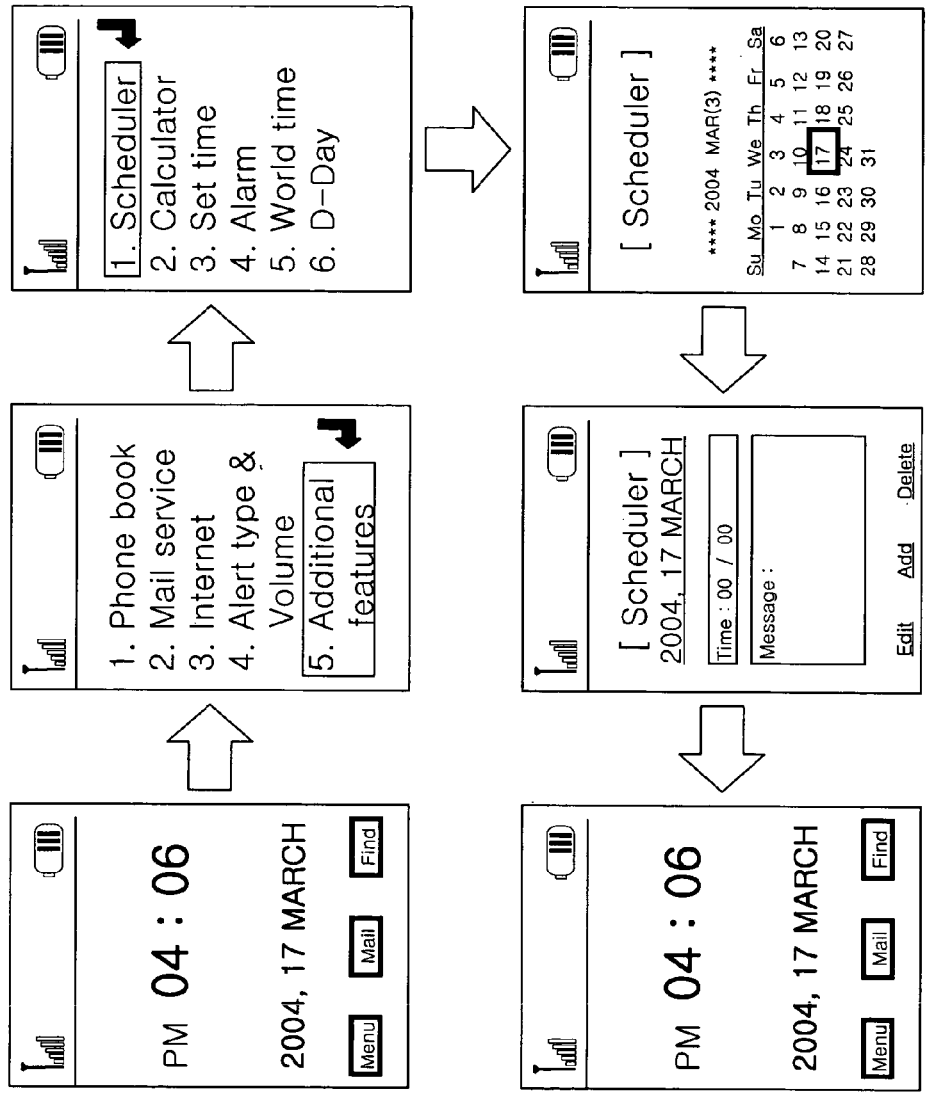
FIG. 1 is an exemplary view illustrating a method for managing a schedule in a mobile communication terminal, in accordance with the related art.
Figure 2:
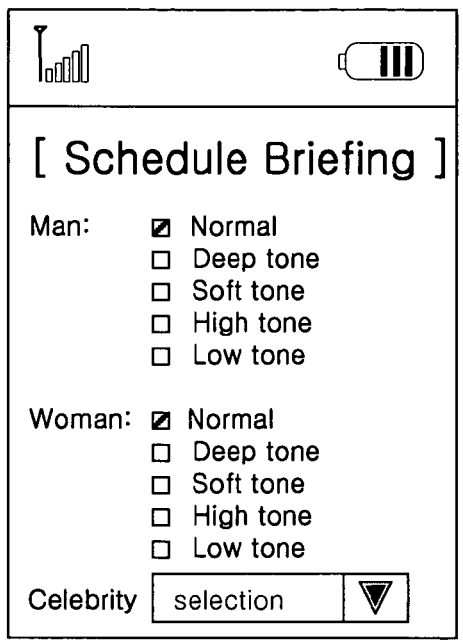
FIG. 2 is an exemplary view illustrating a voice selection menu in accordance with an embodiment of the present invention.
Figure 3:
FIG. 3 is an exemplary view illustrating a supplementary information service menu in accordance with an embodiment of the present invention.

FIGS. 2 and 3 illustrate exemplary views of menus regarding the schedule briefing method in accordance with an embodiment of the present invention. Specifically, FIG. 2 illustrates a voice select menu and FIG. 3 illustrates a supplementary information service menu.

With reference to FIG. 2, the mobile communication terminal is provided with various audible forms of communication, such as voices, wherein the user may select one or more voices to announce a schedule or a particular event. Preferably, the user can select a desired voice, such as a male or female voice or the voice of a celebrity, for example. Also, the user may preferably select from the voice select menu of FIG. 2 a voice tone, such as a low tone, a high tone, a deep tone, a soft tone, and the like. Alternatively, the user may select a default voice generated by the TTS, which should preferably be capable to annunciate all inputted text.

With reference to FIG. 3, the user of the mobile communication terminal may select a service from a supplementary service select menu installed in the terminal. The selected information service may be provided along with or in the absence of any scheduled events to be announced during the schedule briefing. The supplementary information service may comprise a weather forecast information service, a stock or market information service, a news information service, a traffic information service, a humor service or the like. The various supplementary information services are to be provided by a communication service provider, wherein the user selects specific contents of each service.

Figure 4:
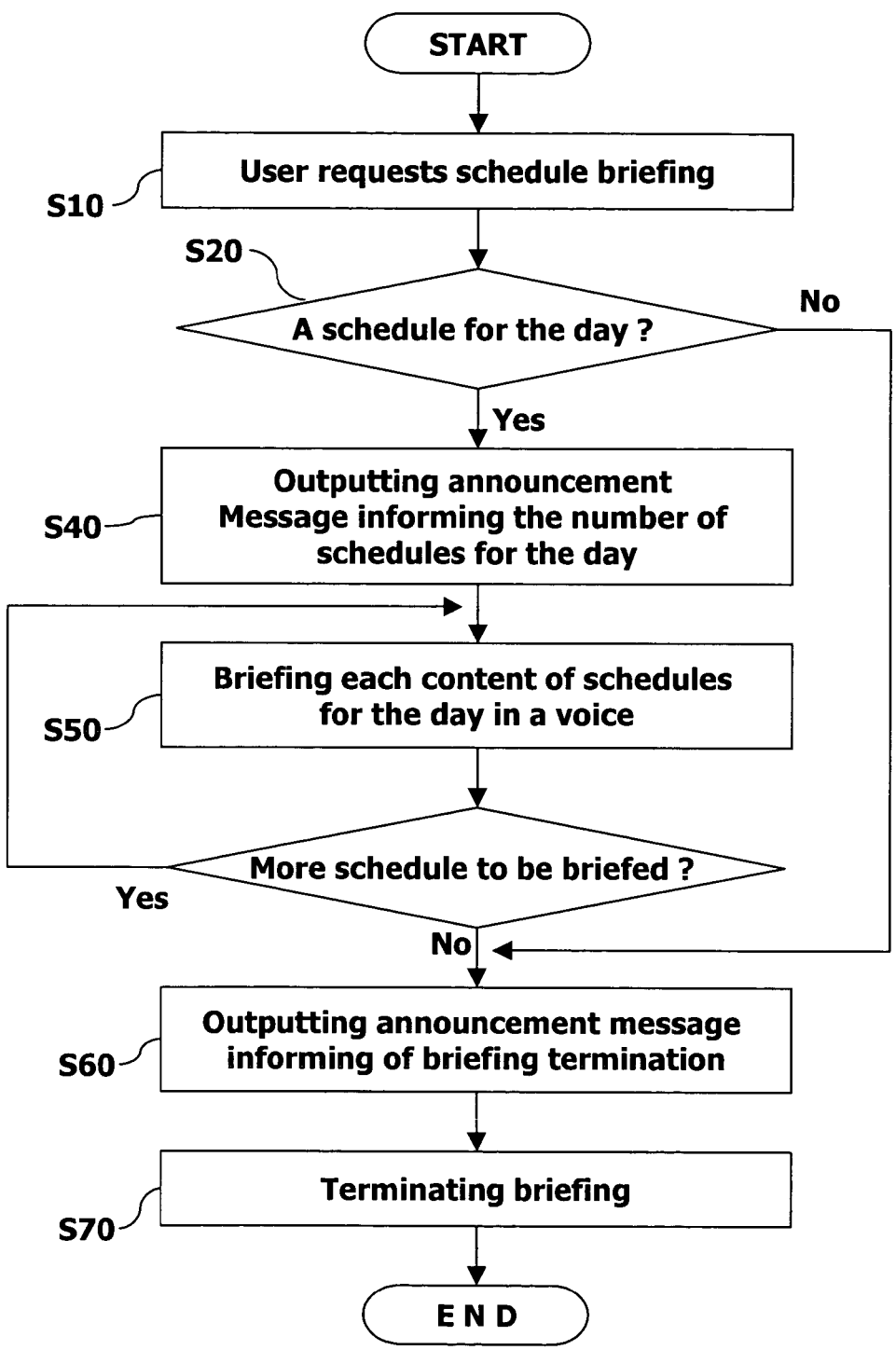
FIG. 4 illustrates a flow chart of a schedule briefing method in accordance with an embodiment of the present invention.

FIG. 4 illustrates a flow chart of a schedule briefing method in accordance with an embodiment of the present invention, wherein the method will be described with reference to FIGS. 2 to 4 as follows.

When the user requests a schedule briefing, such as when the user presses a preprogrammed smart key for a schedule briefing (step S10), the scheduler installed in the terminal searches whether there is a schedule for a corresponding date (step S20). The scheduler may search stored memory within the terminal or within a server which the terminal accesses. If there is no schedule, a corresponding voice announcement message (e.g., "no schedule, briefing is terminated") is outputted (step S60) and the briefing function is terminated (step S70). The voice announcement can be outputted through an earpiece or through a speakerphone installed in the terminal.

If, however, there is a stored schedule, the scheduler outputs a voice message informing of the number of events or schedules (e.g., "today there are five events") (step S40) and outputs a voice message for a content of each event of the schedule (step S50). Alternatively, the user may have two separate schedules to be announced, such as one for work (e.g., meetings, conference calls, etc.) and another for personal events (e.g., home service appointment, birthday, etc.).

The voice message for the content of the schedule may be divided into a portion where the same content is repeated (e.g., something is due at some time) and a portion where a content is changed whenever a briefing is made. The repeated portion is audibly outputted via speech while the non-repeated portion is handled by a mechanical voice or sound generated by the TTS function.

In the step (S50), if the voice message of the stored schedule is completely outputted, the scheduler outputs a voice message (e.g., "no further events or schedules" and "briefing is terminated"), which indicates that the briefing has been completed (step S60) and terminates the schedule briefing process (step S70).

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents.

What is claimed is:

1. A method for audibly providing a schedule briefing at a mobile terminal, the method comprising:
   initiating the schedule briefing in response to a single user input received at the mobile terminal;
   providing, during the schedule briefing, first audio when at least one event that has a specific scheduled time that is later than a current time is present within a specific period,
      wherein the first audio comprises a voice message corresponding to one of a plurality of scheduled events that are each scheduled at a different time within the specific period,
      wherein the specific period is relative to the current time at which the single input is received,
      wherein the first audio is provided via a text to speech (TTS) function,
      and
      wherein a number of the plurality of scheduled events is variable based on the current time;
   audibly announcing termination of the schedule briefing when there are no more events scheduled within the specific period after the first audio is provided;
   terminating the schedule briefing after audibly announcing that the schedule briefing is being terminated; and providing, during the schedule briefing, second audio when no scheduled event is present within the specific period,
    wherein the second audio comprises a voice announcement message indicating that no event is scheduled, the schedule briefing terminated after the second audio is provided.

2. The method of claim 1, wherein the specific period is an entire day on which the single user input is received.

3. The method of claim 1, wherein the first audio and the second audio are vocally output.

4. The method of claim 3, wherein at least the first audio or the second audio is vocally output in the form of a voice selected from the group consisting of a male voice, a female voice, a mechanical voice, and a voice of one or more celebrities.

5. The method of claim 1, further comprising:
providing third audio comprising supplementary information that relates to the current time after announcing the first audio,
    wherein the supplementary information is provided via the third audio without requiring an additional user input further to the single user input.

6. The method of claim 5, wherein the second audio is provided with the third audio when no event is scheduled for the specific period.

7. The method of claim 5, wherein the supplementary information is provided by a communication service provider.

8. The method of claim 7, wherein the plurality of scheduled events are stored in the mobile terminal.

9. The method of claim 7, wherein the supplementary information comprises at least weather forecast information.

10. The method of claim 9, wherein the supplementary information further comprises news information.

11. The method of claim 5, wherein the third audio is output in a mechanical voice.

12. The method of claim 5, wherein the supplementary information is pre-selected by a user from a menu listing a plurality of items, each item representing different supplementary information, such that the third audio relates to only the pre-selected supplementary information.

13. The method of claim 1, further comprising:
audibly outputting a number of the plurality of scheduled events for the specific period in further response to the single user input, the number indicating how many event or events is/are scheduled for the specific period,
    wherein the number is audibly output prior to providing the first audio.

14. The method of claim 1, wherein the single user input is received via a key of the mobile terminal.

15. A mobile communication terminal, comprising:
a display configured to display information;
an audio output unit configured to output audio; and
a controller operatively coupled to the display and the audio output unit, the controller configured to:
    initiate a schedule briefing in response to a single user input received at the mobile terminal;
    cause the audio output unit to provide first audio during the schedule briefing when at least one event that has a specific scheduled time that is later than a current time is present within a specific period,
        wherein the first audio comprises a voice message corresponding to one of a plurality of scheduled events that are each scheduled at a different time within the specific period,
        wherein the specific period is relative to the current time at which the single input is received,
        wherein the first audio is provided via a text to speech (TTS) function,
        and
        wherein a number of the plurality of scheduled events is variable based on the current time;
    cause the audio output unit to announce termination of the schedule briefing when there are no more events scheduled within the specific period after the first audio is provided;
    terminate the schedule briefing after audibly announcing that the schedule briefing is being terminated; and
    cause the audio output unit to provide second audio during the schedule briefing when no scheduled event is present within the specific period,
        wherein the second audio comprises a voice announcement message indicating that no event is scheduled, the schedule briefing terminated after the second audio is provided.

16. The mobile communication terminal of claim 15, wherein the specific period is an entire day on which the single user input is received.

17. The mobile communication terminal of claim 15, wherein the first audio and the second audio are vocally output via the audio output unit.

18. The mobile communication terminal of claim 17, wherein at least the first audio or the second audio is vocally output in the form of a voice selected from the group consisting of a male voice, a female voice, a mechanical voice, and a voice of one or more celebrities.

19. The mobile communication terminal of claim 15, wherein the controller is further configured to:
cause the audio output unit to provide third audio comprising supplementary information that relates to the current time after announcing the first audio,
    wherein the supplementary information is provided via the third audio without requiring an additional user input further to the single user input.

20. The mobile communication terminal of claim 19, wherein the second audio is provided with the third audio when no event is scheduled for the specific period.

21. The mobile communication terminal of claim 19, wherein the supplementary information is provided by a communication service provider.

22. The mobile communication terminal of claim 21, wherein the plurality of scheduled events are stored in the mobile communication terminal.

23. The mobile communication terminal of claim 21, wherein the supplementary information comprises at least weather forecast information.

24. The mobile communication terminal of claim 23, wherein the supplementary information further comprises news information.

25. The mobile communication terminal of claim 19, wherein the third audio is output via the audio output unit in a mechanical voice.

26. The mobile communication terminal of claim 19, wherein the supplementary information is pre-selected by a user from a menu displayed via the display and listing a plurality of items, each item representing different supplementary information, such that the third audio relates to only the pre-selected supplementary information.

27. The mobile communication terminal of claim 15, wherein the controller is further configured to:

cause the audio output unit to output a number of the plurality of scheduled events for the specific period in further response to the single user input, the number indicating how many event or events is/are scheduled for the specific period, wherein the number is audibly output prior to providing the first audio.

* * * * *